(12) United States Patent
Matho et al.

(10) Patent No.: US 11,731,070 B2
(45) Date of Patent: Aug. 22, 2023

(54) FILTER DEVICE

(71) Applicants: Lufttechnik Gransee GmbH, Gransee (DE); Oerlikon Textile GmbH & Co KG, Remscheid (DE)

(72) Inventors: Rainer Matho, Berlin (DE); Andreas Mueller, Zehdenick (DE); Stephan Rickerts, Grossenaspe (DE); Ernst Claussen, Steinfeld (DE); Hauke Petersen, Oering (DE); Frank Knoedler, Bruegge (DE); Sonja Dittscher, Trappenkamp (DE)

(73) Assignee: Oerlikon Textile GmbH & Co KG, Remscheid (DE)

( * ) Notice: Subject to any disclaimer, the term of this patent is extended or adjusted under 35 U.S.C. 154(b) by 336 days.

(21) Appl. No.: 17/225,258

(22) Filed: Apr. 8, 2021

(65) Prior Publication Data
US 2021/0316244 A1 Oct. 14, 2021

(30) Foreign Application Priority Data
Apr. 9, 2020 (DE) ..................... 10 2020 110 081.7

(51) Int. Cl.
*B01D 46/42* (2006.01)
*B01D 46/00* (2022.01)
(Continued)

(52) U.S. Cl.
CPC ..... *B01D 46/4227* (2013.01); *B01D 46/0004* (2013.01); *B01D 46/0005* (2013.01);
(Continued)

(58) Field of Classification Search
CPC .......................... B01D 46/88; B01D 46/4227; B01D 46/0004; B01D 46/0005; B01D 46/62; B01D 46/90
See application file for complete search history.

(56) References Cited

U.S. PATENT DOCUMENTS

| 3,354,616 A | 11/1967 | Lucas |
| 4,124,361 A | 11/1978 | Revell |

(Continued)

FOREIGN PATENT DOCUMENTS

| CN | 107913551 A | 4/2018 |
| DE | 2754513 A1 | 11/1978 |

(Continued)

OTHER PUBLICATIONS

European Search Report dated Jul. 21, 2021 issued in EP 21 16 4606 (with English translation of relevant parts).
(Continued)

*Primary Examiner* — Robert Clemente
(74) *Attorney, Agent, or Firm* — Collard & Roe, P.C.

(57) ABSTRACT

A filter device for filtering particles from an air stream has an inlet channel through which the air to be purified flows, at least one filter element through which the air can flow and which is interchangeably held in a flow channel, and an outlet channel through which the purified air flows, an insertion chamber which can be closed by a door and from which a filter element can be fed to the flow channel, and an output chamber closable by a closure element, into which a filter element is feedable from the flow channel. The closure element of the output chamber is locked in the closed position via a locking mechanism when the door on the insertion chamber is opened and the output chamber and the insertion chamber are connected to the same flow channel.

12 Claims, 13 Drawing Sheets

(51) Int. Cl.
*B01D 46/62* (2022.01)
*B01D 46/88* (2022.01)
*B01D 46/90* (2022.01)

(52) U.S. Cl.
CPC ............ *B01D 46/62* (2022.01); *B01D 46/88* (2022.01); *B01D 46/90* (2022.01)

(56) References Cited

U.S. PATENT DOCUMENTS

| | | | |
|---|---|---|---|
| 4,193,779 | A | 3/1980 | Hencke |
| 4,251,245 | A | 2/1981 | Reynolds |
| 4,497,642 | A | 2/1985 | Hackney |
| 5,837,040 | A | 11/1998 | Caughron et al. |
| 6,248,237 | B1 | 6/2001 | Mery et al. |
| 7,090,711 | B2 | 8/2006 | Gillingham et al. |
| 7,186,290 | B2 * | 3/2007 | Sheehan ............ B01D 46/0028 55/497 |
| 2006/0016163 | A1 | 1/2006 | O'Connor et al. |
| 2011/0277441 | A1 | 11/2011 | Ayshford |
| 2016/0243923 | A1 | 8/2016 | Denninger et al. |
| 2020/0230540 | A1 | 7/2020 | Schumacher |
| 2021/0318007 | A1 * | 10/2021 | Matho .................... B01D 46/90 |
| 2021/0354068 | A1 * | 11/2021 | Rickerts ................ B01D 46/64 |

FOREIGN PATENT DOCUMENTS

| | | |
|---|---|---|
| DE | 2802369 A1 | 7/1979 |
| DE | 9101692 U1 | 5/1991 |
| DE | 202016001034 U1 | 4/2016 |
| EP | 0099212 A2 | 1/1984 |

OTHER PUBLICATIONS

European Search Report dated Jul. 22, 2021 issued in EP 21 16 4609 (with English translation of relevant parts).
European Search Report dated Oct. 13, 2021 issued in the corresponding European Application Serial No. EP 21 16 4606 (with English translation of relevant parts).

* cited by examiner

FILTER DEVICE

CROSS-REFERENCE TO RELATED APPLICATIONS

This application claims priority under 35 USC 119 of German Application No. DE 10 2020 110 081.7, filed on Apr. 9, 2020, the disclosure of which is herein incorporated by reference.

BACKGROUND OF THE INVENTION

The present invention relates to a filter device for filtering particles from an air stream, comprising an inlet channel through which the air to be purified flows, at least one filter element through which the air can flow and which is replaceably held in a flow channel, and an outlet channel through which the purified air flows.

For cleaning an air stream, drum filters are known in which a surface of the drum filter is cleaned via a suction nozzle, as is known from DE 28 02 369 A1. However, such cleaning during the production process in continuous operation is poorly suited for finer particles.

DE 91 01 692 U1 discloses a filter device in an air channel system that can be replaced. For replacement, the filter device with the filter element is completely removed from the filter device and fed into a cleaning process. The disadvantage of such a filter device, however, is that the production process must be interrupted in order to change the filter elements.

SUMMARY OF THE INVENTION

It is therefore an object of the present invention to provide a filter device for filtering particles from an air stream, which enables a filter element to be replaced without interrupting the process and which is easy to operate.

This object is solved with a filter device for filtering particles from an air stream, having an inlet channel through which the air to be purified flows, at least one filter element through which a flow can pass and which is held replaceably in a flow channel, and an outlet channel through which the purified air flows.

The filter device according to the invention has an insertion chamber closable by a door, from which the filter element can be fed to the flow channel, and an output chamber closable by a closure element, into which a filter element can be fed from the flow channel, wherein the closure element of the output chamber is locked in the closed position via a locking mechanism when the door on the insertion chamber is open, and the output chamber and the insertion chamber are connected to the same flow channel. This can prevent incorrect operation when replacing a filter element, since the closure element of the output chamber can only be opened when the door on the insertion chamber is closed. Therefore, the user must first insert a filter element into the insertion chamber and close the closure element before the closure element on the output chamber can then be opened. In this case, the locking mechanism is effective at the same shaft at which the insertion chamber, the flow channel and the output chamber are connected to each other and form a common shaft. The shaft may preferably be oriented vertically as a drop shaft, but orientation horizontally or in any other direction is also possible. The filter device can have several such shafts in succession in the direction of flow.

An opening is preferably formed between the insertion chamber and the flow channel, which can be closed by a movable cover. The opening can be released by the cover when the door on the insertion chamber is arranged in the closed position. This prevents both the opening and the door from being arranged in an open position, which leads to foreign air being sucked in at the filter device and has an impact on the production process, especially if it is a pressure-sensitive production process, for example in fiber production. To ensure that the door on the insertion chamber and the opening between the insertion chamber and the flow channel are not open at the same time, the door can be movable together with the cover to open and close the insertion chamber. A corresponding opening in the cover then releases the opening between the insertion chamber and the flow channel only when the sliding door is in a closed position.

In a further design of the invention, the cover is slidable together with a blocking element of the locking mechanism. The blocking element may, for example, comprise a slot in which a web connected to a rotatable axle of the rotatable locking element engages, which web blocks rotation of the axle in the region of the slot, wherein a widened portion is provided in the slot at which the web of the axle is rotatable for opening the locking element. For example, the web may have a rectangular cross-section so that the web is not rotatable in the region of the narrow slot, but allows rotation in the region of the widened portion. Thus, by moving the blocking element with the slot relative to the web on the axle, a locking of the locking element can be produced or cancelled.

Preferably, at least two filter elements are arranged one behind the other in the flow channel, which are designed, for example, as coarse filters and fine filters. Each filter element can have a filter surface on which suspended particles and particulates are filtered out of the air, for example by screens, fabrics, wires or nonwoven materials.

According to a further embodiment according to the invention, the filter device has an insertion chamber which can be closed by a door and from which a filter element can be fed to the flow channel, and an output chamber which can be closed by a closure element and into which a filter element can be fed from the flow channel, wherein the flow channel comprises at least two filter elements arranged one behind the other in the direction of flow, which are coded by a different geometry and can each be inserted only into one of two adjacent insertion chambers of two or more adjacent insertion chambers. This ensures that only one insertion chamber is assigned to each filter element by a specific geometry, so that interchanging of the filter elements is ruled out. Particularly when different filter elements are used as coarse filters or fine filters, coding by means of a geometry can prevent another filter element from being inserted into a specific insertion chamber. Such coding can, for example, be formed by different widths, different thicknesses or other geometric designs, such as bevels, projections or pins.

Preferably, each door and/or each closure element can be positioned on the insertion chamber or the output chamber in a sealed manner via a circumferential seal. Particularly in production plants with pressure-sensitive production processes, an intake of foreign air at the filter device can thus be kept to a minimum.

Preferably, a cover can be inserted on the filter element, which covers a filter cake on the filter element, so that the unit consisting of filter element and cover can be removed from the output chamber. The cover can be used to close the filter element during the removal process, so that the separated particles forming the filter cake are held securely inside the filter element by the cover. For this purpose, the filter element can be designed as a filter cartridge, which has a circumferential frame around a filter surface. Furthermore, a latching or locking mechanism can optionally be provided on the cover, which can be latched or locked to the filter element, for example via a rotating part. Then the filter element can be removed from the output chamber via the cover, wherein the cover preferably comprises a handle element for this purpose, so that the user can only pull out the filter element after the cover has been fitted.

BRIEF DESCRIPTION OF THE DRAWINGS

The invention is explained in more detail below by means of an exemplary embodiment with reference to the accompanying drawings, wherein.

DETAILED DESCRIPTION OF THE EMBODIMENTS

Figure 1:
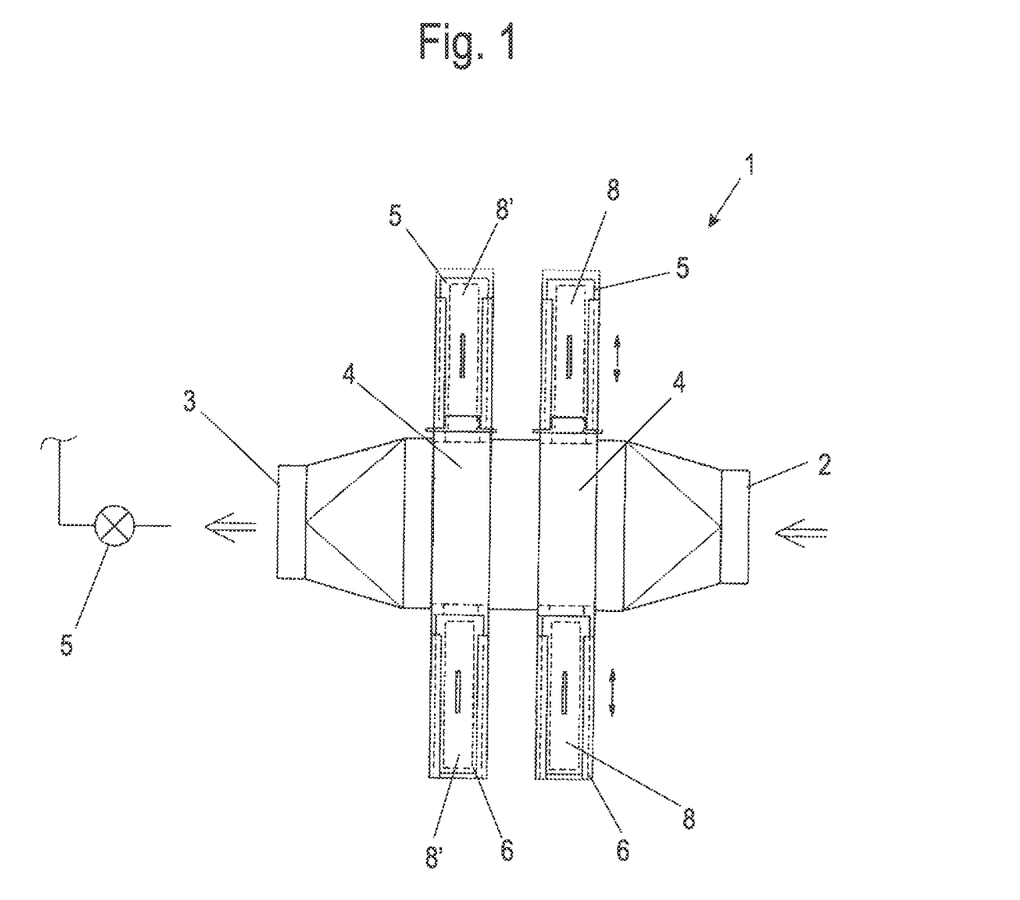
FIG. 1 shows a schematic view of a filter device according to the invention.

A filter device 1 is used for the filtration of an air flow, for example in a production plant for fibers or filaments or for the purification of combustion exhaust gases. The filter device 1 comprises an inlet channel 2, at which the air to be cleaned flows in, and an outlet channel 3, from which the cleaned air flows out. Between the inlet channel 2 and the outlet channel 3, one or more chambers are arranged in a flow channel 4, in which a filter element 8 or 8' can be positioned.

In order to be able to change the filter element arranged in the flow channel 4 during operation, an insertion chamber 5 and an output chamber 6 are provided adjacent to the flow channel 4. In this case, the inlet channel 2 is connected to a chamber in the flow channel 4, which in turn is connected to the outlet channel 3. Such a shaft can be arranged one or several times in succession, as seen in the direction of flow, for example in order to use a filter element 8 as a coarse filter and a filter element 8' as a fine filter. However, the replacement of the used filter elements 8 or 8' is carried out in the same way.

In operation, a filter element 8 or 8' is arranged in the flow channel 4 and is supported by a stop or a filter element 8 or 8' in the output chamber 6. To insert a new filter element 8 or 8', it is inserted into the associated insertion chamber 5, which is then closed. Subsequently, a filter element 8 or 8' is removed at the output chamber 6, so that either immediately or after closing a closure element at the output chamber 6, the filter element 8 or 8' arranged in the flow channel 4 is displaced into the output chamber 6, optionally via a spring element or gravity. Then the filter element 8 or 8' arranged in the insertion chamber 5 can slide down into the flow channel 4, optionally by gravity or a spring element. Appropriate guide means, such as walls or guide strips, can be provided for this purpose.

Figure 2A:
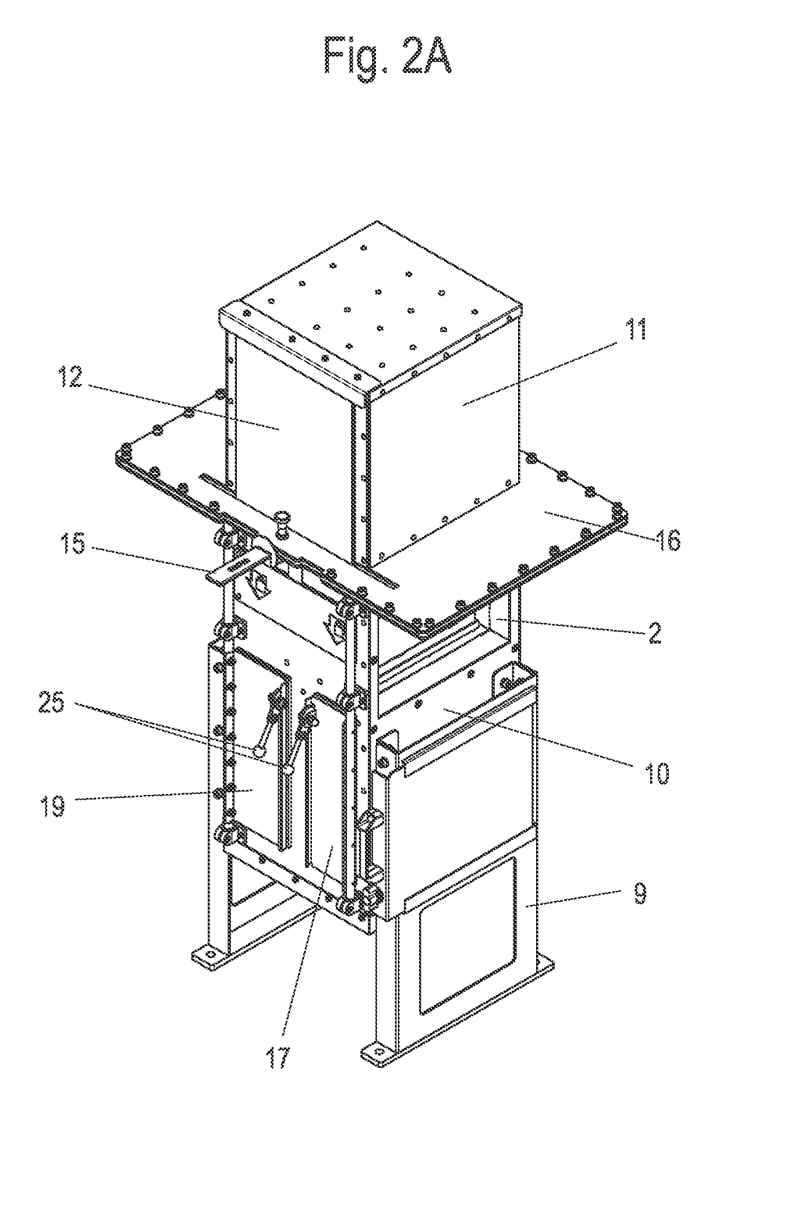
FIGS. 2A to 2D show several perspective views of the filter device in an operating position.
Figure 2B:
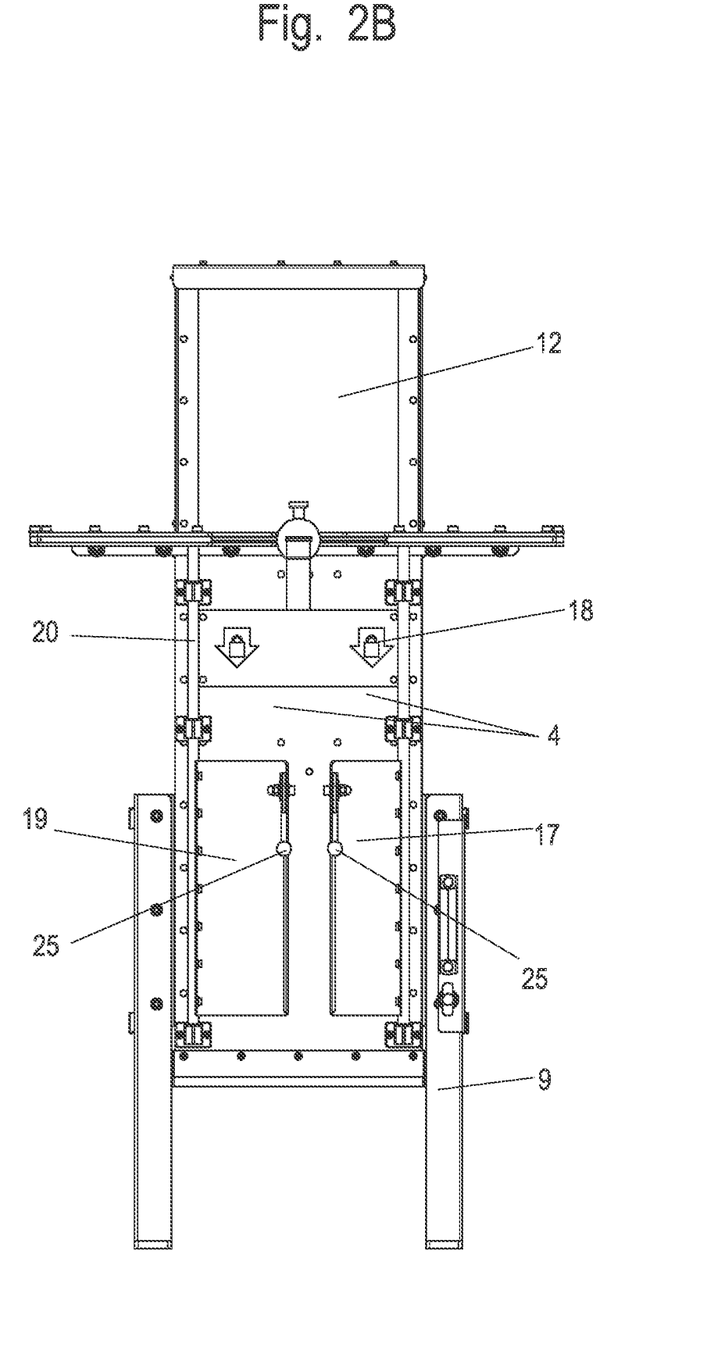

The principle of the filter device, shown only schematically in FIG. 1, is now described in detail:

FIGS. 2A and 2B show the filter device 1, which has a frame 9 on which a housing 10 is held. The housing 10 is formed in a central region as a flow channel, which is connected on one side to an inlet channel 2 and on the opposite side to an outlet channel 3. Between the inlet channel 2 and the outlet channel 3, two chambers are formed on the flow channel 4, on each of which a filter element 8 or 8' can be positioned.

The housing 10 has a hood 11 in the upper area, on which two insertion chambers 5 for a filter element 8 or 8' are formed. Each insertion chamber 5 can be closed via a door 12, which is designed as a sliding door and can be moved via a handle element 15. In FIGS. 2A and 2B, both openings to the insertion chambers 5 are closed.

Two output chambers 6 are arranged below the flow channel 4, wherein one output chamber 6 is closable via a closure element 17 and another output chamber is closable via a closure element 19. The closure element 17 is rotatably mounted on an axle 18, and the closure element 19 is rotatably mounted about an axle 20. The closure elements 17 and 19 can each be locked in the closed position via an actuating lever 25.

Figure 2C:
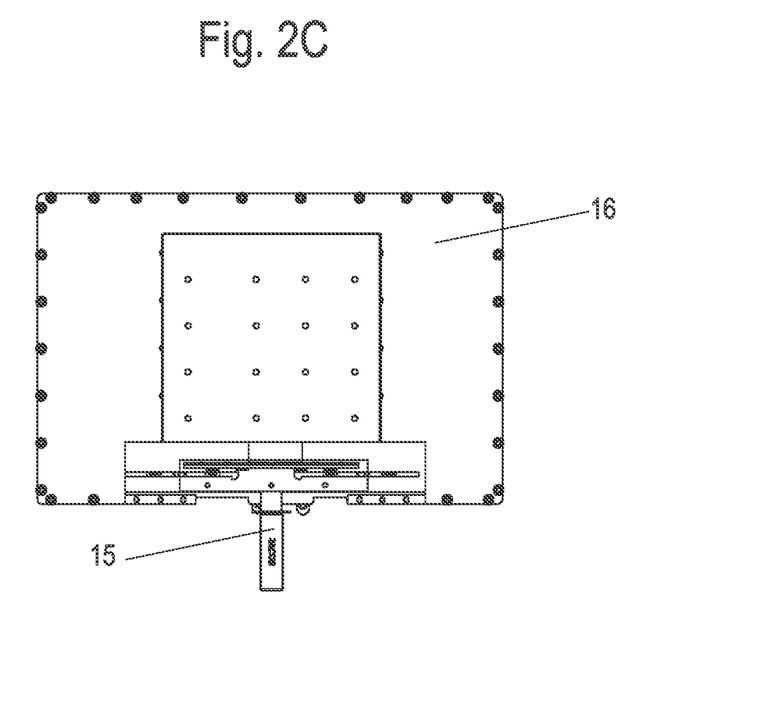
Figure 2D:
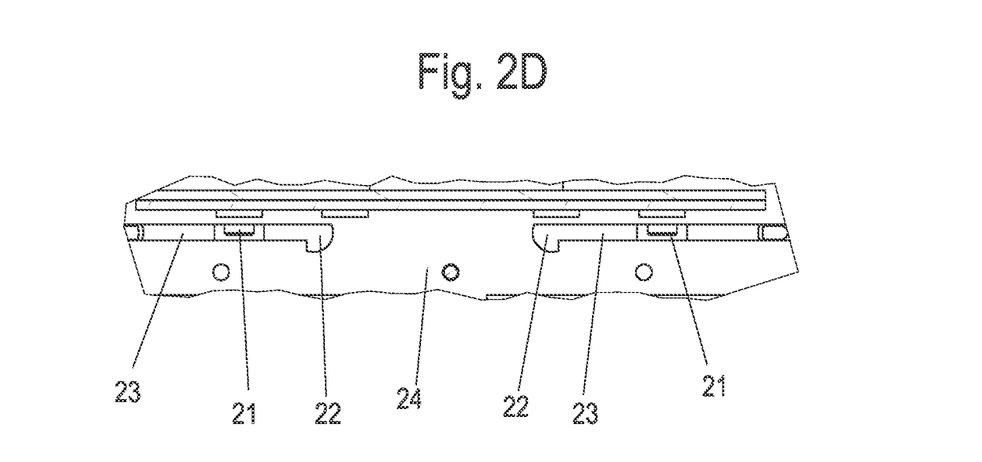

In the operating position, the two closure elements 17 and 19 of the output chambers 6 are locked against opening. For this purpose, a blocking element is provided which is displaceable together with the door. As can be seen from the plan view of FIG. 2C and the enlarged view of FIG. 2D, the blocking element comprises a slot 23 on which a widened portion 22 is formed at the end. A web 21, which is rectangular in cross-section, engages in the slot 23 and is blocked against rotational movement by the walls on the slot. In this case, the web 21 is connected to the axle 18 in a rotationally fixed manner or is formed integrally therewith. The web 21 on the left side in FIG. 2D is non-rotatably connected to or integral with the axle 20. By blocking a rotational movement of the webs 21, a pivoting movement of the closure elements 17 and 19 is thus prevented. In this central position of the door 12, an inadvertent opening of the closure elements 17 and 19 is thus prevented, since a new filter element 8 or 8' must first be inserted into an insertion chamber 5 during a replacement process.

Figure 3A:
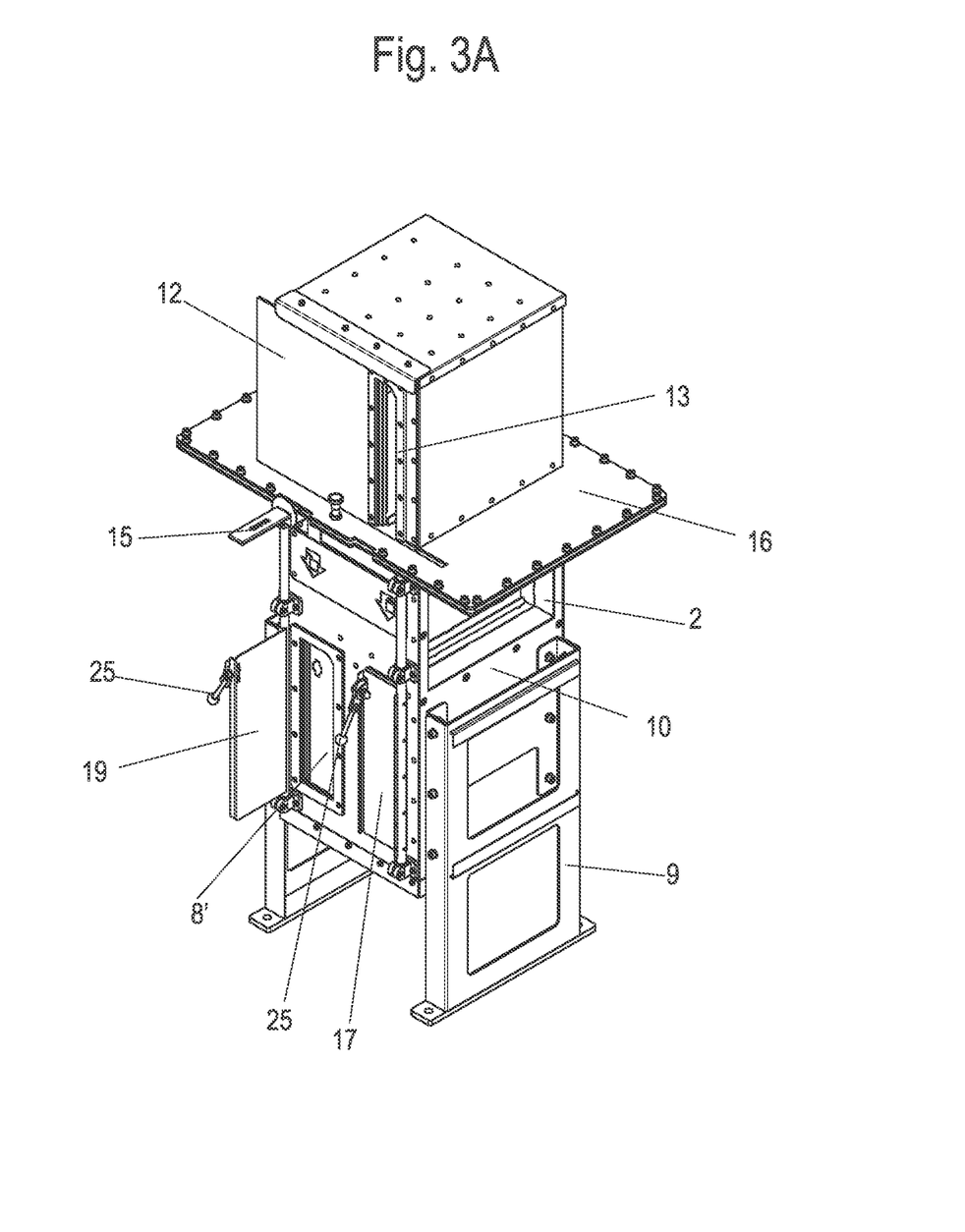
FIGS. 3A through 3D show several views of the filter device of FIG. 2 with the first insertion chamber open.
Figure 3B:
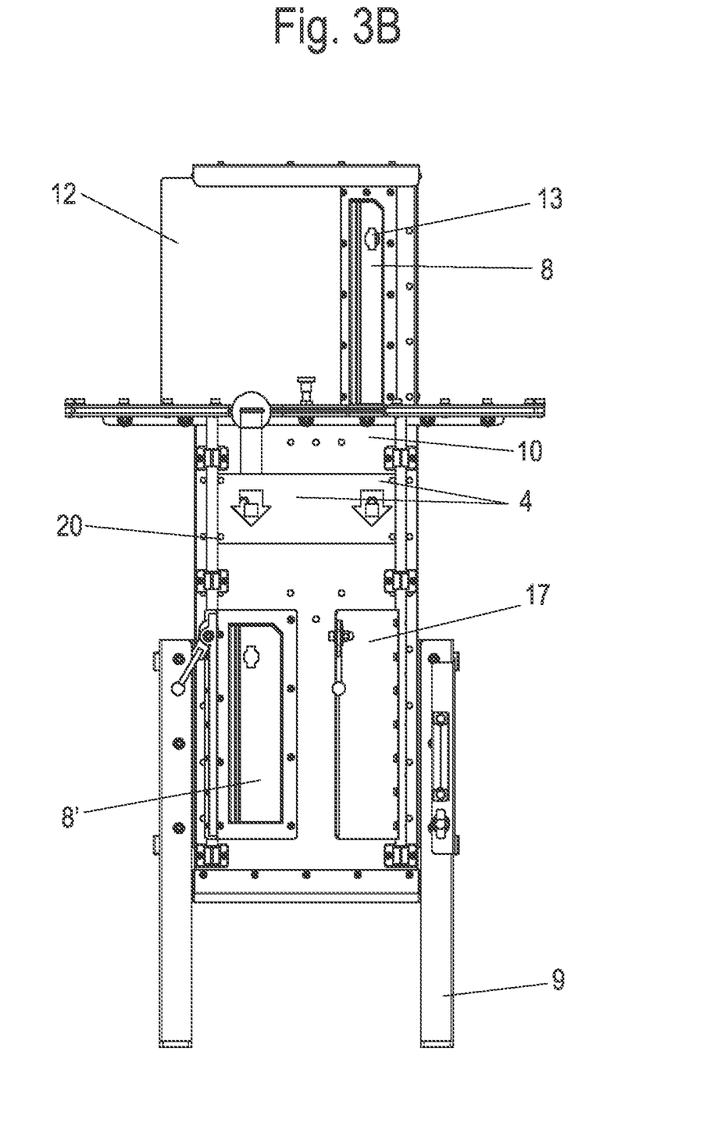
Figure 3C:
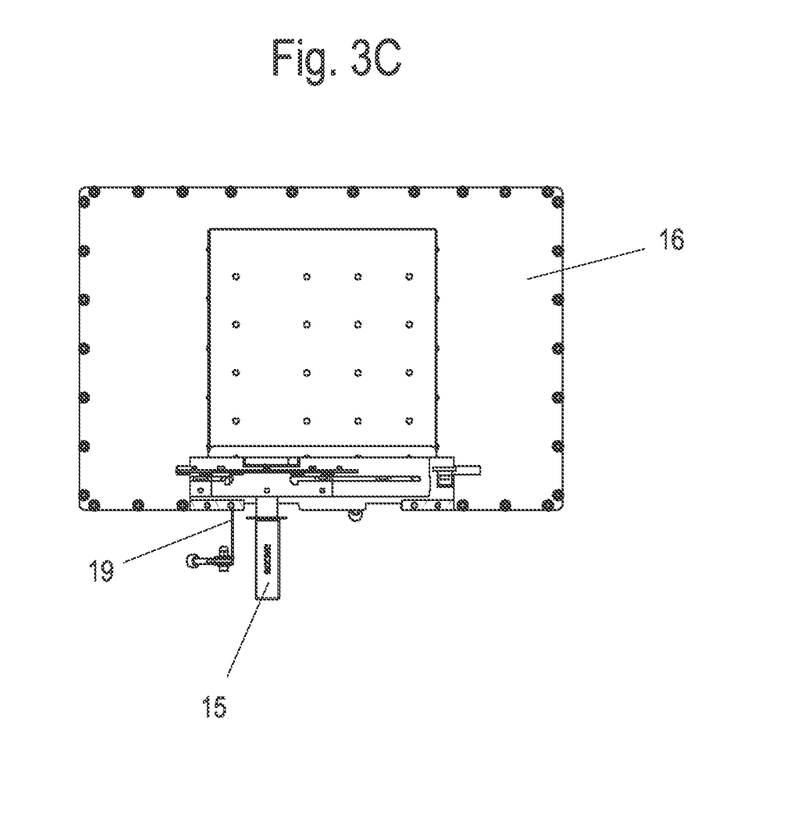
Figure 3D:
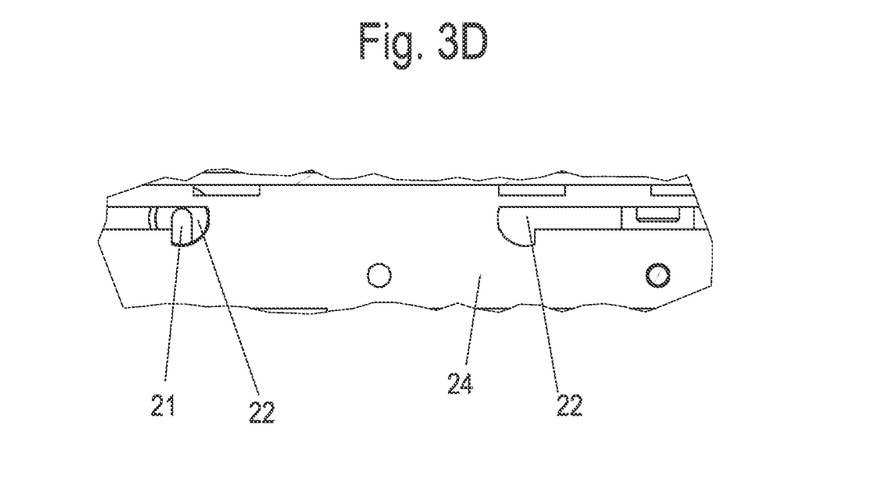

In FIGS. 3A and 3B, the filter device 1 is shown in a position in which the door 12 has been displaced to open an opening 13 for the insertion chamber 5 on the right-hand side. The door 12 is displaced by means of the handle element 15, which is also used to displace the blocking element. Handle element 15 is mounted on a plate 16, which guides the handle element 15. When the insertion chamber 5 is open on the right-hand side, a filter element 8 can be inserted, wherein the geometry of the insertion chamber 5 on the right-hand side is such that only a specific filter element 8 can be inserted, for example all filter elements 8 of the same geometry, which then each form a coarse filter.

In this position of the door 12, moreover, the locking element 19 can be opened on the left side. This is due to the fact that the blocking element with a plate 24 has been displaced, so that the web 21 on the axle 20 is now no longer arranged in the area of the slot 23, but in the area of the widened portion 22. The widened portion 22 has a greater width in the longitudinal direction of the slot 23 than the slot 23, so that the web 21 can be rotated together with the axle 20 in order to open the closure element 19. In this position, the filter element 8' in the output chamber 6 can optionally be pulled out.

Figure 4A:
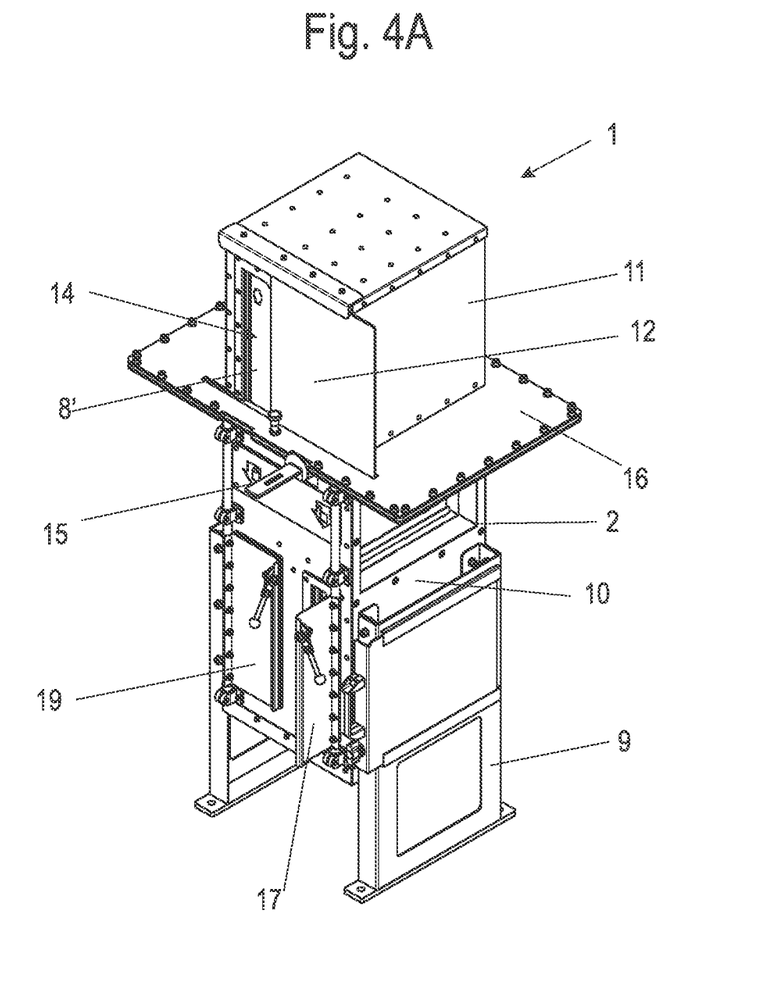
FIGS. 4A through 4D show several views of the filter device of FIG. 2 with the first output chamber open.
Figure 4B:
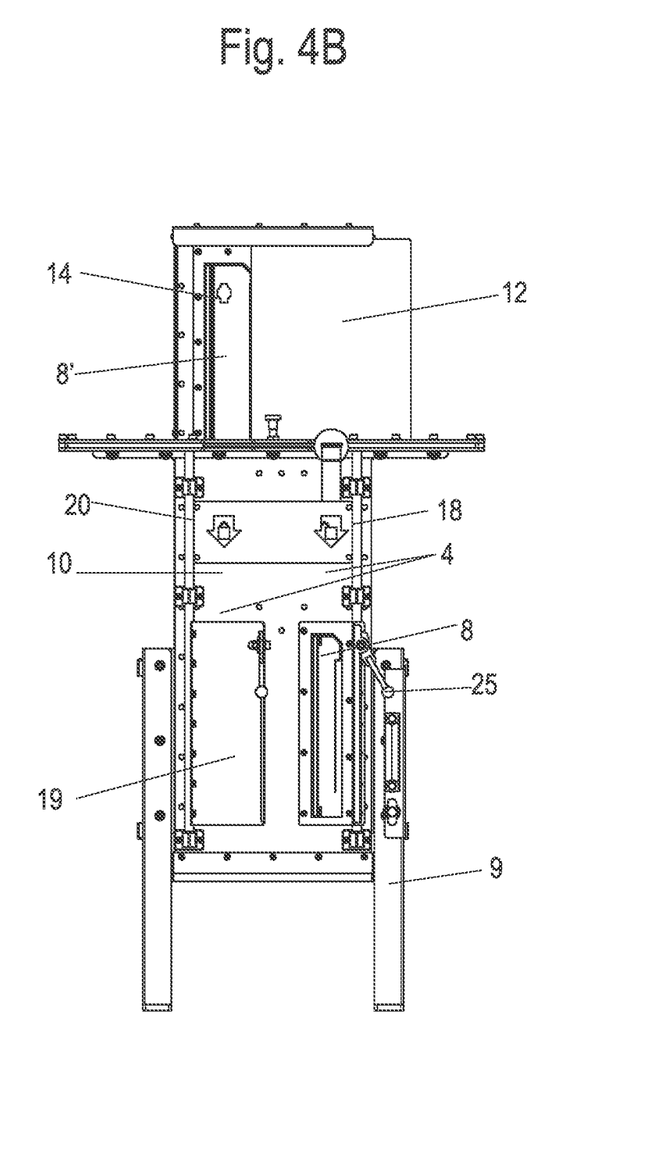
Figure 4C:
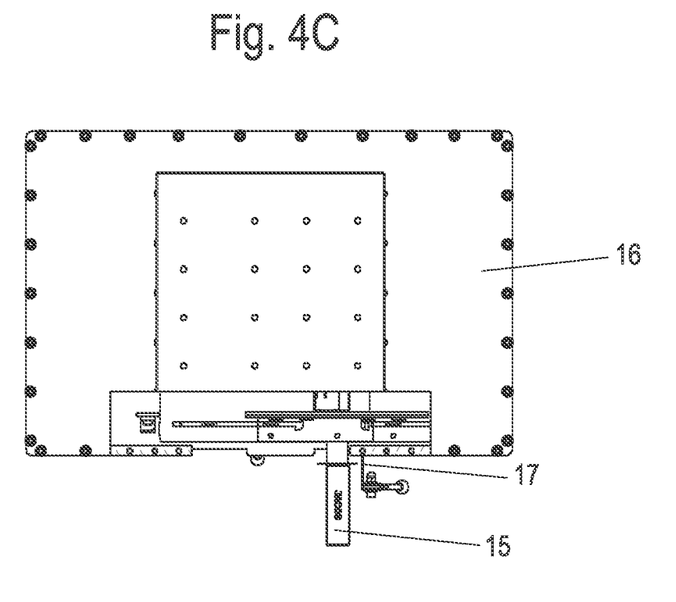
Figure 4D:
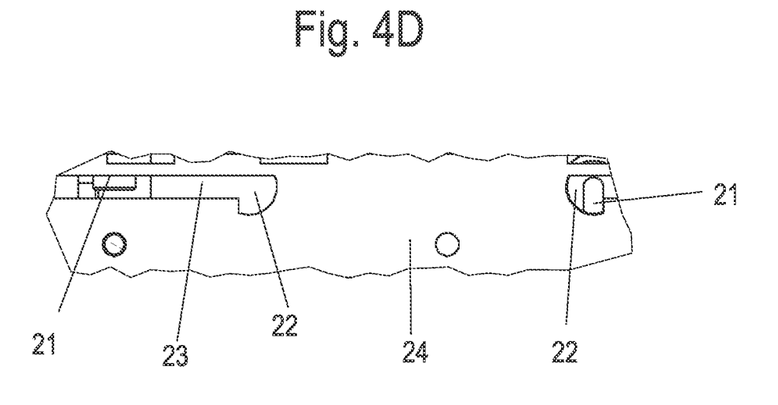

If the filter element 8 in the flow channel 4 is to be replaced first during the filter change, the door 12 is closed and moved to the position shown in FIGS. 4A and 4B after the filter element 8 has been inserted into the insertion chamber 5. The door 12 closes the opening 13 to the insertion chamber 5 on the right side, but exposes an opening 14 to the insertion chamber 5 on the left side for a filter element 8'. By moving the door 12 to the right end position, the blocking element has also been displaced, so that now the web 21, which is connected to or integrally formed on the axle 18, is arranged in the widened portion 22, so that now the closure element 17 can be pivoted about the axle 18. In this position, a filter element 8 can now be removed from the output chamber 6. By removing the filter element 8 arranged in the output chamber 6, the filter element 8 which is arranged in the flow channel 4 and is to be replaced can now slide downwards, so that the filter element 8 in the insertion chamber 5 can thereby slide downwards into the flow channel 4. In practice, it is often the case that the filter element 8 located in the flow channel 4 is pressed against a stop by the air flow to be cleaned, in particular when foreign air is drawn in through the open output chamber 6. Then a displacement of the filter element 8 in the flow channel and the filter element 8 in the insertion chamber 5 takes place only when the closure element 17 is closed, so that a negative pressure builds up in the output chamber 6, which ensures that the filter element 8 in the flow channel 4 is detached. Optionally, a displacement of the filter elements 8 can also be supported or stimulated by mechanical means.

After the filter element 8 has been changed as a coarse filter in the flow channel 4, the filter element 8' can now be changed as a fine filter. For this purpose, a cleaned filter element 8' is first inserted into the insertion chamber 5 when the door 12 is in the right end position as shown in FIG. 4B. Subsequently, the door 12 can be moved to the left end position shown in FIG. 3B. In this position, the left insertion chamber 5 is closed and a passage from the insertion chamber 5 to the flow channel 4 is opened. In addition, the closure element 19 is to be opened in order to remove the filter element 8' from the output chamber 6.

To remove the filter elements 8 and 8', a cover 32 can be inserted into the respective filter elements 8 or 8', which can be stored on the frame 9.

Figure 5A:
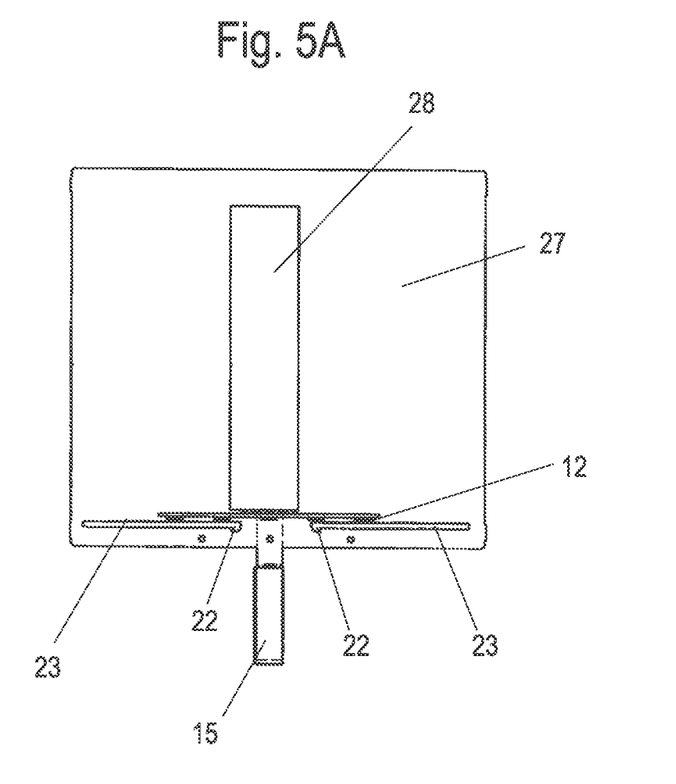
FIGS. 5A and 5B show two detailed views of a cover element between the insertion chamber and the flow channel.
Figure 5B:
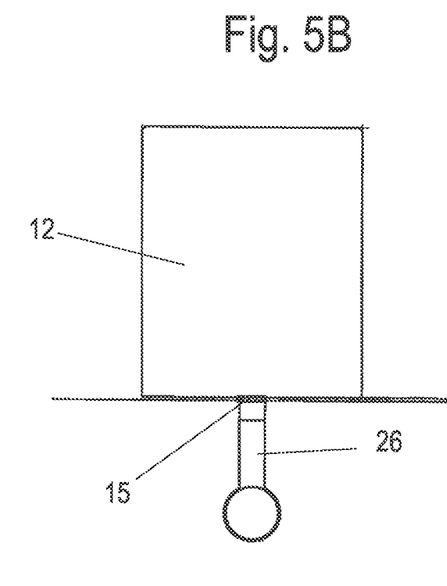

FIGS. 5A and 5B show the door 12, which is movable together with a cover 27. The cover 27 has an opening 28 and can thus selectively open or close a passage between an insertion chamber 5 and the flow channel 4. The width of the opening 28 is formed to be wide enough to allow all filter elements 8 or 8' to slide through the opening 28. On the cover 27, a front area is also formed as a blocking element in which the slots 23 with the end-side widened portion 22 are recessed. Thus, with the movement of the door 12 via the handle element 15, a blocking of the closure elements 17 and 19 can take place simultaneously, and in addition, a connection between an insertion chamber 5 and the flow channel 4 can be opened and closed.

The design of the door 12 and the cover 27 ensures that the insertion chamber 5 is always closed to the flow channel 4 when a filter element 8 is changed. When the insertion chamber is opened at an opening 13 at the front, as shown in FIG. 3B, the cover 27 covers the opening to the flow channel 4 so that only a small amount of foreign air can be drawn in. When the new filter element 8 is inserted into the insertion chamber 5, the door 12 can be pivoted to the position shown in FIG. 4B, thereby uncovering the opening between the insertion chamber 5 and the flow channel 4, since the opening 28 is then located under the insertion chamber 5. However, the flow channel 4 is sealed to the outside since the door 12 is closed. In this position, the closure element 17 can then be opened to remove the filter element 8 from the output chamber. A gap between the filter element 8 in the flow channel 4 and the output chamber 6 can be dimensioned so small that only slight foreign air is drawn in when the filter element 8 is removed, but this results in negligible pressure fluctuations and does not impair the production process.

Furthermore, a projection is formed on the handle element 15 as a marking element 26, so that the user can more easily see whether the door is arranged in a central closed position or in one of the two lateral open positions. Furthermore, markings can be provided to identify the individual steps for changing the filter elements 8, 8'.

Figure 6:
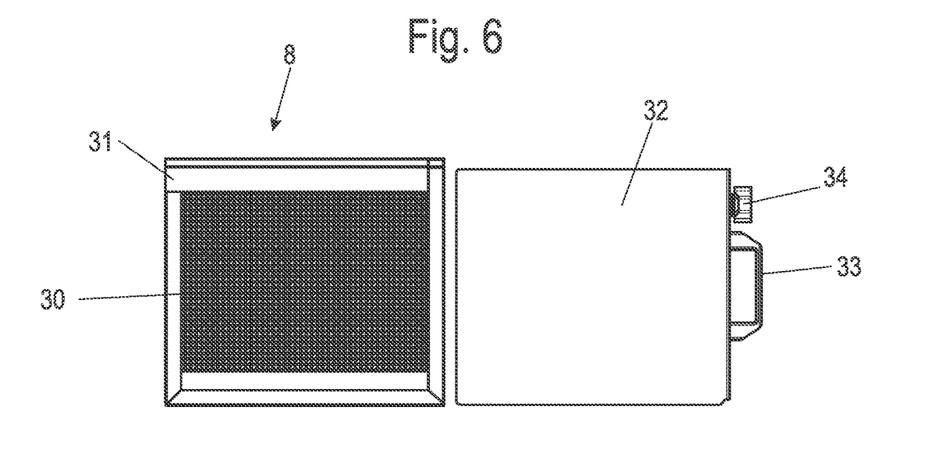
FIG. 6 shows a view of a filter element and cover before assembly.

In FIG. 6, a filter element 8 is shown which has a filter surface 30, for example a screen, a fabric, a perforated grid or a nonwoven material, wherein the filter surface 30 is surrounded by a frame 31. Guide means, for example grooves, are formed on the frame 31 in order to be able to cover the filter surface 30. Here, a filter cake deposited on the filter surface 30 can be covered by the cover 32, so that when the filter element 8 is removed from the output chamber 6, as far as possible, no particles are sucked in by the foreign air, which then enters the flow channel 4.

To prevent a user from manually removing the filter element 8 from the output chamber 6 without the cover 32, a rotating part 34 of a latching or locking mechanism is provided on the cover 32. After the cover 32 has been pushed onto the filter element 8, the rotating part 34 can be used to lock or latch the cover 32 to the filter element 8, after which a handle element 33 on the cover 32 can be used to pull the unit comprising the filter element 8 and the cover 32 out of the output chamber 6. The rotating part 34 can be designed, for example, as a bayonet catch, which can be inserted into an opening on the filter element 8 in a first position and then effects locking by rotating through 90°.

Figure 7A:
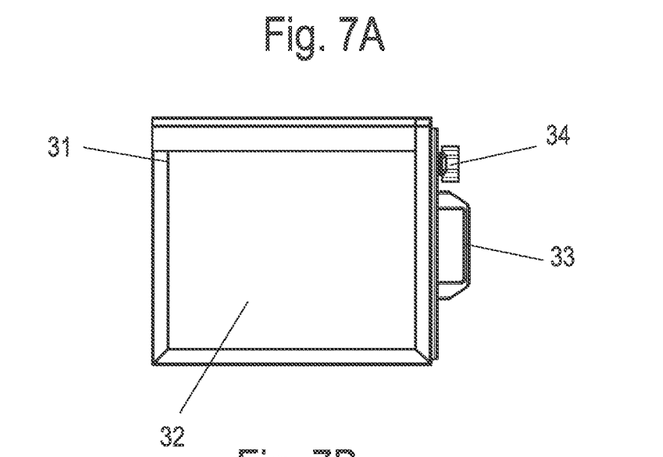
FIGS. 7A to 7C show several views of the filter element of FIG. 6 with mounted cover.
Figure 7B:
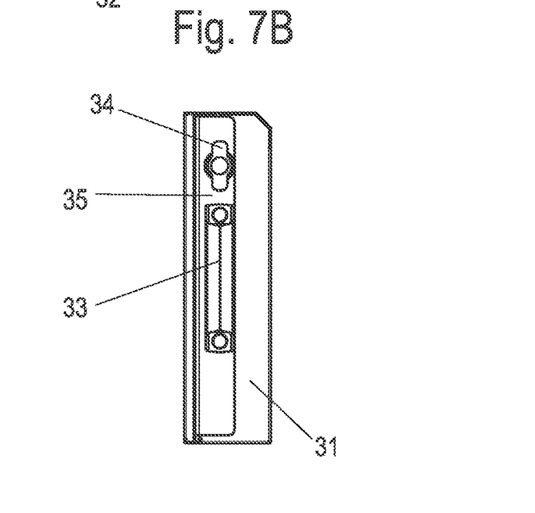

In FIGS. 7A and 7B, the cover 32 is arranged on the filter element 8, and it can be seen that the cover 32 is surrounded on the edge by the frame 31. As a result, the filter element 8 is largely sealed. The cover 32 is plate-shaped and can be formed from a metal sheet or plastic, for example a transparent plastic, so that the inner region of the filter element 8 remains visible.

The cover 32 comprises an angled section 35 on which the rotating part 34 is rotatably mounted and on which the handle element 33 is fixed. The cover 32 can be designed in one or more parts.

Figure 7C:
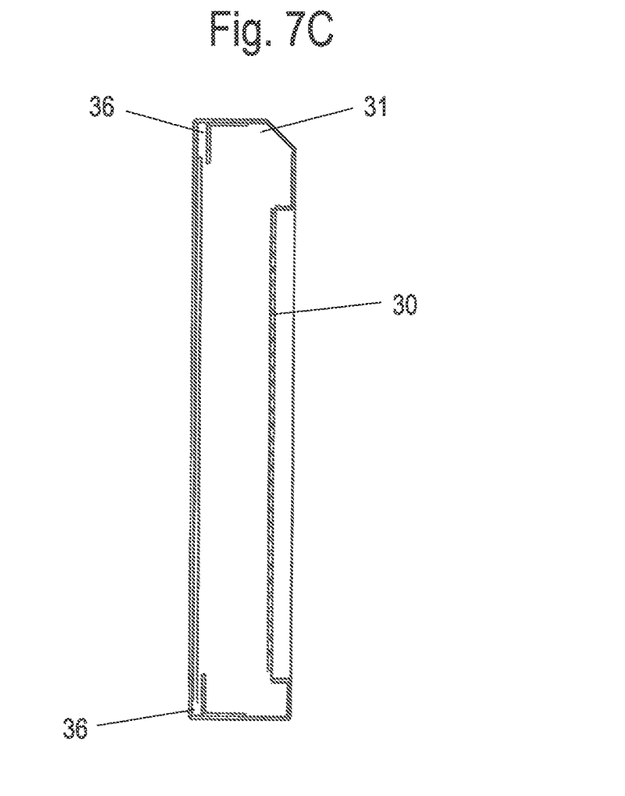

FIG. 7C shows a section through the filter element 8, and it can be seen that a groove 36 is formed on opposite sides, into which an edge of the plate-shaped cover 32 can be inserted. At the end face, the cover 32 can then be locked to the frame 31 via the rotating part 34.

Figure 8:
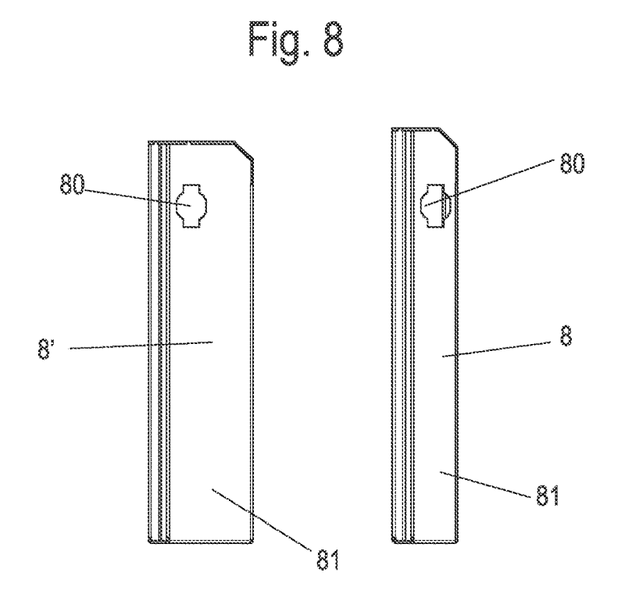
FIG. 8 shows a view of two different filter elements.

FIG. 8 shows two different filter elements 8 and 8', which have different thicknesses and can optionally also have different heights. This ensures that only one filter element 8 of a predetermined type can be inserted into a single opening of the insertion chamber 5 in each case, so that incorrect operation is reliably prevented by the geometry of the filter elements 8 and 8'. Each filter element 8 includes an opening 80 on the frame 31 that is engageable with the rotating part 34 on the cover 32. Optionally, other locking mechanisms or latching mechanisms can be used to create a releasable connection between the cover 32 and a filter element 8 or 8'.

In the exemplary embodiment shown, the filter device 1 has two shafts arranged one behind the other in the direction of flow, wherein each shaft has an insertion chamber 5, a chamber in the flow channel 4 and an output chamber 6. Guide means for the filter elements 8, 8' may be provided on each shaft.

It is obviously possible to provide only one shaft or more than two shafts on a filter device 1 instead of two. In the illustrated exemplary embodiment, the door 12 is designed to be displaceable, while the closure elements 17 and 19 are pivotably mounted. It is obviously also possible to design the door 12 so as to be pivotable as well, and in particular a multi-part door with different leaves can be provided instead of the single-part door. In addition, the closure elements 17 and 19 can also be designed to be movable instead of pivotable.

LIST OF REFERENCE NUMERALS

1 Filter device
2 Inlet channel
3 Outlet channel
4 Flow channel
5 Insertion chamber
6 Output chamber
8, 8' Filter element
9 Frame
10 Housing
11 Hood
12 Door
13 Opening
14 Opening
15 Handle element
16 Plate
17 Closure element
18 Axle
19 Closure element
20 Axle
21 Web
22 Widened portion
23 Slot
24 Plate
25 Actuating lever
26 Marking element
27 Cover
28 Opening
30 Filter surface
31 Frame
32 Cover
33 Handle element
34 Rotating part
35 Angled section
36 Groove
80 Opening

What is claimed is:

1. A filter device for filtering particles from an air stream, comprising:
    an inlet channel through which air to be purified flows,
    a flow channel connected to the inlet channel,
    at least one filter element through which a flow can pass and which is held replaceably in the flow channel,
    an outlet channel through which the purified air flows,
    an insertion chamber having a door configured for closing the insertion chamber and from which insertion chamber the at least one filter element can be fed to the flow channel, and
    an output chamber having a closure element that is configured for closing the output chamber, wherein the at least one filter element can be fed to the output chamber from the flow channel, wherein the closure element is locked in a closed position via a locking mechanism when the door on the insertion chamber is open and the output chamber and the insertion chamber are connected to a same flow channel.

2. The filter device according to claim 1, wherein an opening is formed between the insertion chamber and the flow channel, and further comprising a movable cover that is configured for closing the opening.

3. The filter device according to claim 2, wherein the cover is releasable when the door on the insertion chamber is in the closed position.

4. The filter device according to claim 2, wherein the door on the insertion chamber is configured to be closed together with the cover.

5. The filter device according to claim 2, wherein the cover is displaceable together with a blocking element of the locking mechanism.

6. The filter device according to claim 5, wherein the blocking element comprises a slot, into which a web connected to a rotatable axle of the rotatable closure element engages, wherein the web blocks a rotation of the axle in a region of the slot, wherein a widened portion is provided on the slot, on which the web of the axle is rotatable for opening the closure element.

7. The filter device according to claim 1, wherein the at least one filter element comprises at least two filter elements arranged one behind the other in the flow direction in the flow channel.

8. A filter device for filtering particles from an air stream, comprising;
    an inlet channel through which the air to be purified flows,
    a flow channel connected to the inlet channel,
    at least two filter elements through which the air can flow and which are held replaceably in the flow channel arranged one behind the other in a direction of flow,
    an outlet channel through which the purified air flows,
    at least two insertion chambers, each having a door that is configured to close the insertion chambers, each insertion chamber being configured for feeding one of the filter elements to the flow channel, and
    an output chamber having a closure element configured for closing the output chamber and into which output chamber one of the filter elements can be fed from the flow channel,
    wherein the filter elements are coded by a different geometry and are each insertable into only one of two adjacent insertion chambers.

9. The filter device according to claim 1, wherein the door and/or the closure element is or are sealably positionable on the insertion chamber or the output chamber via a circumferential seal.

10. The filter device according to claim 1, further comprising a cover that is configured to be inserted on the at least one filter element and which is configured to cover a filter cake on the at least one filter element so that a unit of the at least one filter element and cover is removable from the output chamber.

11. The filter device according to claim 10, wherein the at least one filter element is formed as a filter cartridge having a circumferential frame around a filter surface.

12. The filter device according to claim 10, wherein a latching or locking mechanism is formed on the cover, which latching or locking mechanism can be latched or locked to the at least one filter element in order to remove the filter cartridge via a handle element arranged on the cover as a unit consisting of the at least one filter element and the cover.

* * * * *

UNITED STATES PATENT AND TRADEMARK OFFICE
CERTIFICATE OF CORRECTION

| | |
|---|---|
| PATENT NO. | : 11,731,070 B2 |
| APPLICATION NO. | : 17/225258 |
| DATED | : August 22, 2023 |
| INVENTOR(S) | : Matho et al. |

It is certified that error appears in the above-identified patent and that said Letters Patent is hereby corrected as shown below:

On the Title Page

Item (73) please change:
"Assignee: Oerlikon Textile GmbH & Co. KG, Remschied (DE)"
To correctly read:
-- Assignees: Lufttechnik Gransee GmbH, Gransee (DE); Oerlikon Textile GmbH & Co. KG, Remschied (DE) --

Signed and Sealed this
Seventh Day of November, 2023

Katherine Kelly Vidal
*Director of the United States Patent and Trademark Office*